(12) United States Patent
Ries et al.

(10) Patent No.: US 10,114,687 B2
(45) Date of Patent: Oct. 30, 2018

(54) SYSTEM FOR CHECKING THE INTEGRITY OF A COMMUNICATION BETWEEN TWO CIRCUITS

(71) Applicant: STMicroelectronics (Grenoble 2) SAS, Grenoble (FR)

(72) Inventors: Gilles Ries, Saint-Jean de Moirans (FR); Abdelaziz Goulahsen, Coublevie (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 64 days.

(21) Appl. No.: 14/949,378

(22) Filed: Nov. 23, 2015

(65) Prior Publication Data

US 2016/0378580 A1 Dec. 29, 2016

(30) Foreign Application Priority Data

Jun. 29, 2015 (FR) ..................... 15 56064

(51) Int. Cl.

| | |
|---|---|
| *G01R 31/317* | (2006.01) |
| *G06F 11/07* | (2006.01) |
| *G06F 21/60* | (2013.01) |
| *G06F 21/64* | (2013.01) |
| *G06F 21/85* | (2013.01) |
| *H04L 1/00* | (2006.01) |

(52) U.S. Cl.
CPC ............ *G06F 11/079* (2013.01); *G06F 11/07* (2013.01); *G06F 11/0751* (2013.01); *G06F 21/606* (2013.01); *G06F 21/64* (2013.01); *G06F 21/85* (2013.01); *H04L 1/0061* (2013.01); *G01R 31/31703* (2013.01); *G06F 2201/83* (2013.01)

(58) Field of Classification Search
CPC .... G06F 21/64; G06F 2201/83; G06F 11/079; G06F 21/85; G06F 21/606; G06F 11/0751; G06F 11/07; H04L 1/0061; G01R 31/31703
USPC ........................................................ 714/732
See application file for complete search history.

(56) References Cited

U.S. PATENT DOCUMENTS

| | | | | |
|---|---|---|---|---|
| 5,604,754 A | * | 2/1997 | Itskin ................. | G06F 11/1679 714/30 |
| 7,295,882 B2 | * | 11/2007 | Champion .......... | G06F 11/0706 700/94 |
| 7,904,775 B2 | * | 3/2011 | Bancel .................... | G06F 21/52 714/732 |

(Continued)

OTHER PUBLICATIONS

French Search Report, dated Apr. 25, 2016, for corresponding French Application No. 1556064, 6 pages.

*Primary Examiner* — James C Kerveros

(74) *Attorney, Agent, or Firm* — Seed IP Law Group LLP

(57) ABSTRACT

A method of verifying integrity of communications between a master circuit and a slave circuit includes updating a first cyclic multibit signature based on each transaction sent by the master circuit to the slave circuit. A second cyclic multibit signature is updated based on each transaction received by the slave circuit. One or more bits based on the second cyclic multibit signature are compared with corresponding bits based on the first cyclic multibit signature, with a number of the one or more bits being less than a total number of bits of the second cyclic signature. Error conditions are detected and responded based on the comparing.

28 Claims, 2 Drawing Sheets

(56) References Cited

U.S. PATENT DOCUMENTS

| | | | |
|---|---|---|---|
| 7,949,931 B2* | 5/2011 | Lastras-Montano | G06F 11/1044 |
| | | | 714/768 |
| 8,341,475 B2* | 12/2012 | Bancel | G06F 21/52 |
| | | | 714/732 |
| 8,560,899 B2* | 10/2013 | Brewerton | G11C 29/024 |
| | | | 714/718 |
| 8,892,963 B2* | 11/2014 | Macri | G06F 11/08 |
| | | | 711/133 |
| 2006/0156129 A1* | 7/2006 | Midgley | G06F 8/65 |
| | | | 714/732 |
| 2007/0104327 A1* | 5/2007 | Macri | G06F 11/08 |
| | | | 380/203 |
| 2009/0183051 A1 | 7/2009 | Balb | |
| 2009/0187794 A1 | 7/2009 | Kim et al. | |
| 2009/0235113 A1 | 9/2009 | Shaeffer et al. | |
| 2011/0258499 A1* | 10/2011 | Casarsa | G01R 31/31701 |
| | | | 714/726 |
| 2013/0117641 A1 | 5/2013 | Bains et al. | |

* cited by examiner

SYSTEM FOR CHECKING THE INTEGRITY OF A COMMUNICATION BETWEEN TWO CIRCUITS

BACKGROUND

Technical Field

The disclosure relates generally to checking of the integrity of a communication between two circuits, and such as checking of the integrity of the data that are read and written by a bus from/to a memory of DDR type.

Description of the Related Art

FIG. 1 is a block diagram of a system implementing a memory of DDR (Double Data Rate) type. The DDR memory is connected to a circuit, for example a system on a chip SoC, by a standardized memory bus B. The SoC circuit and the DDR memory are each connected to the bus B by an address interface A, a data interface D and a control interface CTRL.

In the DDR memory, the interfaces allow access to a memory map MEM that can be associated with an error connection circuit ECC. The address interface A is designed to receive one-way addresses through the bus B, addresses that can be used to select memory cells both in read mode and in write mode. The data interface D is bidirectional—it receives from the bus B data to be written to the memory and produces them through a W channel, and it receives on an R channel data that have been read from the memory and transmits them on the bus. Since the read and write operations in the DDR memory are not concurrent, the data are able to travel through the same lines of the bus B. The control interface CTRL conveys various signals entering and leaving through respective channels W and R.

More detailed information about DDR memory interfaces can be found in the JEDEC standards.

The A, D and CTRL interfaces of the SoC circuit have functions that are symmetrical with respect to the interfaces of the memory.

In some applications (e.g., safety applications), the hope is to guarantee the integrity of the data interchanged with a memory. To this end, redundancy solutions are frequently used that can considerably increase the silicon surface area of the circuits. When standardized components are used, such as DDR memories, the redundancy is often obtained by doubling the number of memories in order to store the data with a copy.

BRIEF SUMMARY

General provision is made for a method for checking the integrity of a communication between a master circuit and a slave circuit, comprising sending transactions from the master circuit to the slave circuit; updating a first cyclic multibit signature from each transaction as present in the master circuit; updating a second cyclic multibit signature, of the same nature as the first, from each transaction as received in the slave circuit; and comparing a single bit of the second cyclic signature with a bit in the same position in the first cyclic signature.

In an embodiment, the method comprises sending the transactions on a bus between the master circuit and the slave circuit; storing each transaction in an FIFO memory having a depth corresponding to delay introduced by the bus; updating the first cyclic signature from the output of the FIFO memory; and transmitting to the master circuit the signature bit to be compared on a line of the bus.

The slave circuit may be a memory of DDR type and the signature bit to be compared can be transmitted by a DMI line of the memory bus.

The first and second cyclic signatures may likewise be based on the data read from the DDR memory.

In an embodiment, the method comprises, for each of the master and slave circuits, dividing the information for each transaction into a plurality of groups; associating with each group a respective cyclic redundancy check code generator; for each transaction, generating the CRC codes in parallel; and producing the bit to be compared by means of an exclusive OR operation combining a single bit of each CRC code.

The combined bits of the CRC codes may be least significant bits.

There is likewise provision for a memory of DDR type comprising a bus interface and a cyclic multibit signature computation circuit that is connected in order to receive states of the bus interface, and in order to provide a single bit of the signature on a line of the bus.

The bus line on which the signature bit is provided may be a DMI line.

In an embodiment, a method comprises: sending transactions from a master circuit to a slave circuit; verifying an integrity of communications between the master circuit and the slave circuit, the verifying including: updating a first cyclic multibit signature based on each transaction sent by the master circuit to the slave circuit; updating a second cyclic multibit signature based on each transaction received by the slave circuit; and comparing one or more bits based on the second cyclic multibit signature with corresponding bits based on the first cyclic multibit signature, a number of the one or more bits being less than a total number of bits of the second cyclic signature; and detecting and responding to an error condition based on the comparing. In an embodiment, the method comprises: sending the transactions on a bus coupled between the master circuit and the slave circuit; storing each transaction in a first-in-first-out (FIFO) memory having a depth corresponding to a delay introduced by the bus; updating the first cyclic multibit signature based on an output of the FIFO memory; and transmitting from the slave circuit to the master circuit the one or more bits based on the second cyclic multibit signature on a line of the bus. In an embodiment, the slave circuit is a memory of a Double Data Rate (DDR) type and the one or more bits based on the second cyclic multibit signature are transmitted on one or more Data Mask Invert (DMI) lines of the bus. In an embodiment, the first and second cyclic multibit signatures are based on data read from the DDR memory. In an embodiment, the one or more bits comprises a single bit and the method comprises, for each transaction: dividing information used to update the second cyclic multibit signature into a plurality of groups; generating respective cyclic redundancy check (CRC) codes in parallel for each group; and performing an exclusive OR operation combining a single bit of each CRC code to produce the single bit. In an embodiment, the combined bits of the CRC codes are least significant bits.

In an embodiment, a device comprises: a bus interface; error detection circuitry coupled to the bus interface, and which, in operation: updates a cyclic multibit signature based on a transaction transmitted on the bus interface; generates a first set of one or more error-detection bits based on the updated cyclic multibit signature, a number of bits of the first set of one or more error-detection bits being less than a total number of bits of the cyclic multibit signature; compares the first set of one or more error-detection bits to a second set of one or more error-detection bits received over the bus interface; and detects and responds to an error condition based on the comparing. In an embodiment, the first set of one or more error-detection bits are a single bit. In an embodiment, the second set of one or more error-detection bits are received on one or more Data Mask Invert (DMI) lines of the bus interface. In an embodiment, the updated cyclic multibit signature is based on data read from a DDR memory coupled to the bus interface. In an embodiment, the first set of one or more error-detection bits comprises a single error-detection bit, the error detection circuitry comprises a plurality of cyclic redundancy check (CRC) circuits, and the error detection circuitry, in operation: divides information used to update the cyclic multibit signature into a plurality of groups; generates respective cyclic redundancy check (CRC) codes in parallel for each group; and performs an exclusive OR operation combining a single bit of each CRC code to produce the single error-detection bit. In an embodiment, the combined bits of the CRC codes are least significant bits. In an embodiment, the error detection circuitry, in operation: stores transaction information in a first-in-first-out (FIFO) memory having a depth corresponding to a delay introduced by a bus coupled to the bus interface; and updates the cyclic multibit signature based on an output of the FIFO memory.

In an embodiment, a device, such as double data rate (DDR) memory, comprises: a bus interface; and a cyclic multibit signature computation circuit coupled to the bus interface, and which, in operation: updates a cyclic multibit signature based on a transaction received on the bus interface; and generates one or more error-detection bits based on the updated cyclic multibit signature, a number of the one or more error-detection bits being less than a total number of bits of the cyclic multibit signature, wherein the bus, in operation, transmits the generated one or more error-detection bits. In an embodiment, the one or more error-detection bits are a single bit transmitted on a single line of the bus interface. In an embodiment, the one or more error-detection bits are transmitted on one or more Data Mask Invert (DMI) lines of the bus interface. In an embodiment, the cyclic multibit signature is based on data read from the DDR memory. In an embodiment, the one or more error-detection bits comprise a single error-detection bit, the cyclic multibit signature computation circuit comprises a plurality of cyclic redundancy check (CRC) circuits, and the cyclic multibit signature computation circuit, in operation: divides information used to update the cyclic multibit signature into a plurality of groups; generates respective cyclic redundancy check (CRC) codes in parallel for each group; and performs an exclusive OR operation combining a single bit of each CRC code to produce the single error-detection bit. In an embodiment, the combined bits of the CRC codes are least significant bits.

In an embodiment, a system comprises: a bus; a slave device coupled to the bus, and a master device coupled to the bus, wherein: the slave device, in operation: updates a first cyclic multibit signature based on a transaction as received by the slave device; generates a first set of one or more error-detection bits based on the updated first cyclic multibit signature, a number of the first set of one or more error-detection bits being less than a total number of bits of the first cyclic multibit signature; and transmits the generated first set of one or more error-detection bits to the master device on the bus; and the master device, in operation: updates a second cyclic multibit signature based on the transaction as transmitted by the master device; generates a second set of one or more error-detection bits based on the updated second cyclic multibit signature, a number of bits of the second set of one or more error-detection bits being equal to a number of bits of the first set of one or more error-detection bits; compares the first set of one or more error-detection bits to the second set of one or more error-detection bits; and detects and responds to an error condition based on the comparing. In an embodiment, the first set of one or more error-detection bits is a single bit. In an embodiment, the first set of one or more error-detection bits comprises a single error-detection bit, the slave device comprises a plurality of cyclic redundancy check (CRC) circuits, and, in operation, the slave device: divides information used to update the cyclic multibit signature into a plurality of groups; generates respective cyclic redundancy check (CRC) codes in parallel for each group; and performs an exclusive OR operation combining a single bit of each CRC code to produce the single error-detection bit. In an embodiment, the master device comprises a first-in-first-out (FIFO) memory having a depth corresponding to a delay introduced by the bus, and, in operation: stores transaction information in the first-in-first-out (FIFO) memory; and updates the second cyclic multibit signature based on an output of the FIFO memory.

BRIEF DESCRIPTION OF THE DRAWINGS

Embodiments will be set out in the description below, which is provided without implying limitation and with reference to the appended figures, and in which.

DETAILED DESCRIPTION

In the ensuing description, numerous specific details are provided in order to facilitate as much as possible understanding of the embodiments provided by way of example. The embodiments may be implemented with or without specific details, or else with other methods, components, materials, etc. In other cases, structures, materials, or operations that are well known are not shown or described in detail so that aspects of the embodiments will not be obscured. Reference in the framework of the present description to "an embodiment" or "one embodiment" means that a given peculiarity, structure, or characteristic described in connection with the embodiment is comprised in at least one embodiment. Hence, recurrence of phrases such as "in an embodiment" or "in one embodiment" in various points of the present description does not necessarily refer to one and the same embodiment. Moreover, the peculiarities, structures, or characteristics may be combined in any convenient way in one or more embodiments.

The notations and references are here provided only for convenience of the reader and do not define the scope or the meaning of the embodiments.

In some applications, it is not necessary to detect a data integrity fault at the very instant at which it occurs. It often suffices for the integrity fault to be detected within a certain period after it has occurred. The period is dependent on the degree of risk that the fault can cause.

On the basis of this relaxed constraint, an embodiment of data integrity checking technique is proposed below. The technique will be described by way of example within the context of the data interchanges with a DDR memory, but embodiments may also be used more generally in order to check the integrity of a communication between two circuits.

Figure 1:
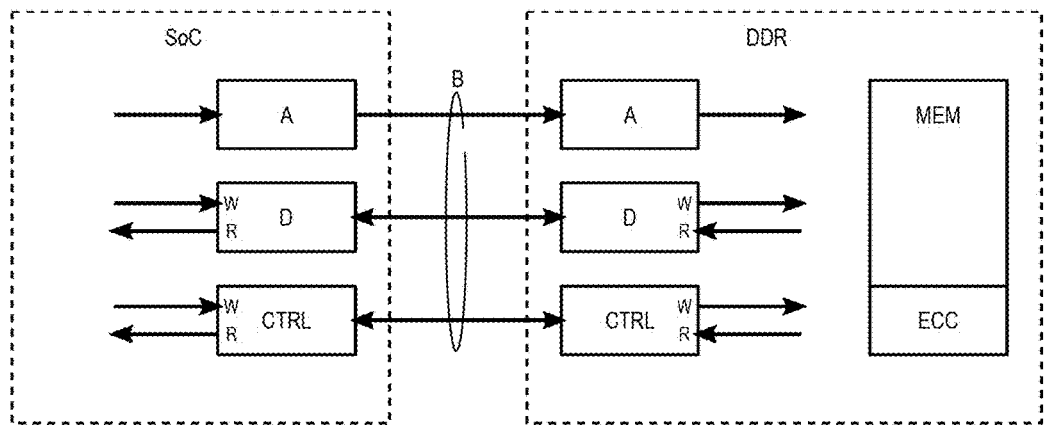
FIG. 1, described above, is a block diagram of a system implementing a memory of DDR type.
Figure 2:
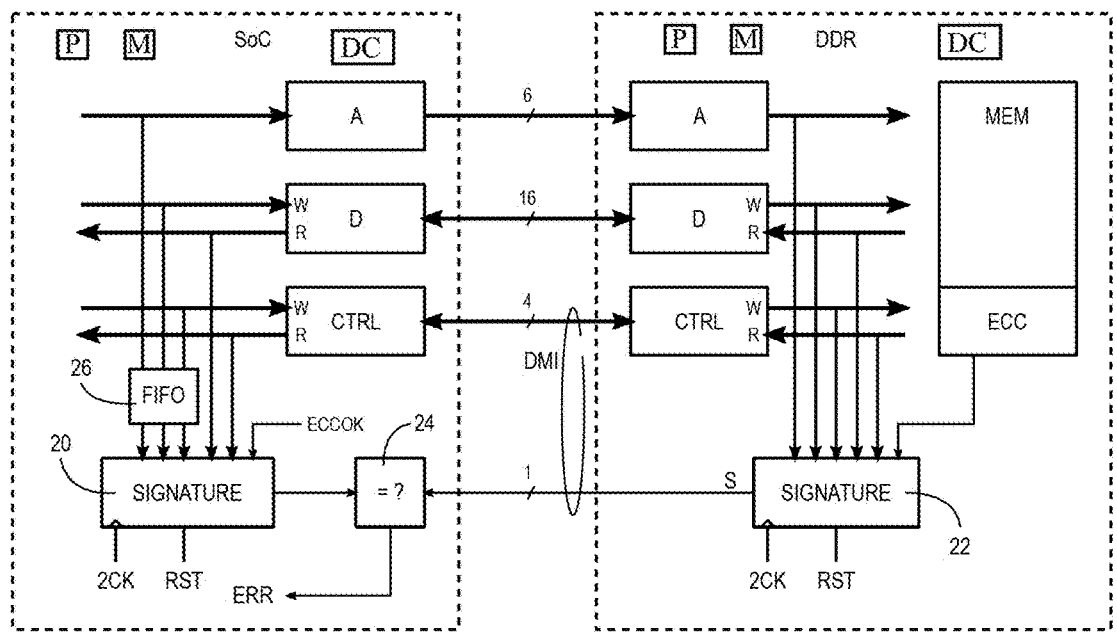
FIG. 2 is a block diagram of a system implementing a memory of DDR type and integrating an embodiment of a circuit for checking the integrity of the information interchanged with the memory.

FIG. 2 shows a system implementing a DDR memory, which is similar in some respects to the system in FIG. 1. In order to check the integrity of the communications through the bus B, a signature generator 20 is connected in the SoC circuit, or master circuit, in order to compute a signature on the basis of each transaction that the SoC circuit sends on the bus B. A second signature generator 22 is connected in the DDR memory, or slave circuit, in order to compute a signature of the same nature as that of the generator 20, on the basis of each transaction as received by the memory on the bus B. The generators 20 and 22 can, for example, be clocked by a clock 2CK that has a frequency twice the frequency of the DDR memory. The reason is that a DDR memory processes a transaction upon each edge of a clock, that is to say twice per period.

It would be possible, in order to check the integrity of the communication, to compare the signatures 20 and 22 upon each transaction. This verifies that the transaction received by the DDR memory is indeed the transaction sent by the SoC circuit. In the event of inequality, an error has been able to be injected on to the lines of the bus, either accidentally or maliciously.

In order to make such a comparison, it would be necessary to transmit the whole of the signature 22 to the SoC circuit, which is not a realistic solution.

In an embodiment, the generators 20 and 22 are designed to compute a cyclic signature, that is to say a recursive signature that is updated upon each transaction and that keeps a history of preceding transactions. The signature may be a cyclic redundancy code or CRC. Moreover, as is shown, a single bit S of the signature 22 is transmitted from the DDR memory to the SoC circuit in order to be compared at 24 with the bit in the same position in the signature 20. If the comparison fails, the comparator 24 activates an error signal ERR. The signatures 20 and 22 can be reset by a signal RST, a single time when the system is powered up, or else from time to time during periods of inactivity on the bus B.

With this configuration, as soon as an error is introduced into a transaction, the signatures 20 and 22 begin to diverge rapidly in the course of the subsequent transactions. Of course, the two bits that have been chosen for comparison do not necessarily differ upon the occurrence of the error, but they have an increasing probability of differing in the course of the subsequent transactions. This probability verges on 1 geometrically according to the relation $1-2^{-n}$, where n is the number of transactions from the one in which the error occurred. Thus, at the end of 30 transactions, there is one chance in a billion of not detecting the error. At the clock rate of the transactions in a DDR memory, that is to say at more than 1 GHz, the error is certain to be detected in less than 30 ns, which is more than enough in many applications, including many safety applications, such as automotive applications, and many security applications, such as set-top-box applications.

The position of the bits (S) that have been chosen for comparison in the signatures is of little importance. In an embodiment, a position in which the signatures vary most rapidly may be chosen, generally near the least significant bits in a signature of CRC type.

The fact that there is only a single bit to communicate between the circuits makes it a simple matter to envisage the transmission of this bit through a dedicated line of the bus, or else to use an existing line of a standardized bus. In some standardized buses, specific lines may be free or have a function chosen from several.

In a DDR memory bus, among the control lines CTRL, two lines called DMI (Data Mask Invert) of the R channel are assigned to the two halves of the data lines in the read mode of the memory. In practice, the databus comprises sixteen lines and conveys two bytes to which the two DMI bits are respectively assigned. When a byte for transmission comprises more 1s than 0s, it is inverted upon transmission. The corresponding DMI line is used to signal this inversion by a 1. By systematically acting on the two bytes of the data lines in this manner, the power consumption linked to the transmission of the data can be decreased by 40% on average. Two equivalent DMI lines, of the W channel, play a symmetrical part in the write mode in the memory.

The DDR memory can be designed so that the function of one of the DMI lines of the R channel is "overloaded" with the function of transmission of the signature bit S. In other words, the user will be able to configure the function that he wants for the overloaded line: either he configures it to have the conventional DMI function or he configures it to transmit the signature bit S.

The choice of the function for transmitting the bit S is then made to the detriment of the DMI function for one of the bytes of data. However, the function of the remaining DMI line can be modified so that it extends to the two bytes of the data lines. In other words, the two bytes are simultaneously inverted before being transmitted when they include more than eight bits at 1 together. This behavior is scarcely less effective than the use of two DMI lines—it allows an average decrease in consumption in the order of 36% against 40%.

In numerous applications, the signature generators 20 and 22 could be connected in order to take account of the single data lines D, sixteen lines in this case. However, in order to detect other possibilities of error, the signature generators may be connected in order to take account of all the lines that have an influence on the data, namely the address lines A, the data lines D and the DMI lines among the control lines CTRL. As is shown, the signature generators can be connected to these lines by the inputs and outputs of the A, D and CTRL interfaces, on the side opposite the lines of the bus B, where the signals are clean. The line used to transmit the signature bit S, if need be one of the DMI lines, can likewise be counted in the signature computations.

Moreover, the signature generator 22, in the DDR memory, can be designed to take account of an error signal that is produced by the error correction circuit ECC, as is shown. The circuit ECC is intended to automatically detect and correct internal errors in the memory map MEM. If it does not manage to correct an error, it produces an error signal that can be taken into account in certain systems.

In the present case, it is convenient for such a signal from the circuit ECC to participate in the checking of the integrity of the data. Then, in the SoC circuit, the generator 20 receives at the same position a constant value ECCOK corresponding to an absence of error.

The bus interfaces A, D and CTRL, since they are generally designed to synchronize the signals of the bus B to clocks CK that are internal to the circuits, introduce a delay of at least one clock cycle. Thus, a transaction presented to the bus in the SoC circuit takes at least two cycles to arrive at the DDR memory. So that the generators 20 and 22 compute a signature using the same values, the inputs of the generator 20 can be delayed by an FIFO memory 26, the depth of which corresponds to the transit time of the bus B. More specifically, only the outgoing signals are delayed (addresses A, write-mode data D(W), and write-mode control lines CTRL(W)). The incoming signals need not be delayed (read-mode data D(R) and read-mode control lines CTRL(R)).

As illustrated, the circuit SoC and the DDR memory each comprises control circuitry, which includes processing circuitry P, one or more memories M and discrete circuitry DC. The processing circuitry P, the one or more memories M and the discrete circuitry DC of the control circuitry may perform, alone or in various combinations, one or more functions of the SoC and the DDR memory, such as generating data and control signals, generating signatures, comparing data bits and generating error signals, etc.

Figure 3:
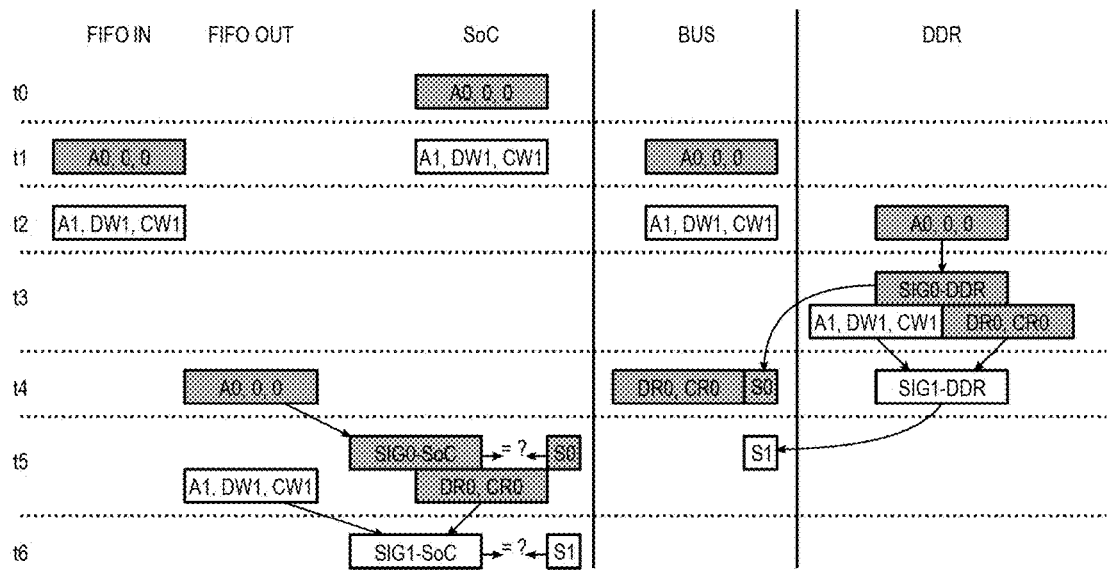
FIG. 3 is a timing diagram illustrating the operation of the integrity checking circuit within the context of an example of information interchange.

FIG. 3 is a timing diagram illustrating an embodiment of the operation of the circuit of FIG. 2 within the context of an example of reading followed by writing. The transactions relating to reading are shown in shaded rectangles, and the transactions relating to writing are shown in white rectangles. The transactions are shown in various columns corresponding to different system elements indicated at the top of the column, and in various rows corresponding to times increasing from top to bottom.

In a cycle t0, the SoC circuit presents the read transaction to the bus interfaces. The transaction contains the read address A0, no data D and no control signal CTRL (at least no DMI signal taken into account in the signature computation). The transaction is denoted (A0, 0, 0), reflecting the states of the A, D and CTRL lines.

In a cycle t1, the transaction (A0, 0, 0) is moved to the FIFO memory (FIFO IN) and is presented in parallel on the bus. The SoC circuit presents the write transaction, containing an address A1 and data DW1. The transaction is denoted (A1, DW1, CW1), where CW1 denotes the state of the control lines CTRL of the write W channel, notably of the DMI lines.

In a cycle t2, the read transaction (A0, 0, 0) arrives in the DDR memory, where it prompts a search for the data and is presented to the signature generator 22. The write transaction (A1, DW1, CW1) is moved to the FIFO memory and appears in parallel on the bus.

In a cycle t3, in the DDR memory, the signature 22 is updated by the read transaction (A0, 0, 0). The value of the signature is denoted SIG0-DDR. At the same time, the memory presents the data requested by the transaction (A0, 0, 0) on the bus interface in a response transaction denoted (DR0, CR0)—data DR0 on the R channel of the D interface, control signals CR0 on the R channel of the CTRL interface. Finally, the write transaction (A1, DW1, CW1) arrives in the memory. The transactions (A1, DW1, CW1) and (DR0, CR0) are presented to the signature generator 22.

In a cycle t4, the bit of the signature SIG0-DDR for comparison, denoted S0, is presented on the bus, at the same time as the response transaction (DR0, CR0). In the DDR memory, the signature 22 is updated by the transactions (A1, DW1, CW1) and (DR0, CR0). The new value of the signature is denoted SIG1-DDR. In the SoC circuit, the transaction (A0, 0, 0) is extracted from the FIFO memory and presented to the signature generator 20.

In a cycle t5, the bit of the signature SIG1-DDR for comparison, denoted S1, is presented on the bus. In the SoC circuit, the generator 20 produces the signature SIG0-SoC updated by the transaction presented in the preceding cycle, namely the transaction (A0, 0, 0) extracted from the FIFO memory. The bit S0 arrives in the SoC circuit and is compared with the bit in the same position in the signature SIG0-SoC. An inequality indicates that an integrity fault has occurred in the transaction (A0, 0, 0) or in at least one of the preceding transactions. In the same cycle, the transaction (A1, DW1, CW1) is extracted from the FIFO memory and presented to the signature generator 20 with the transaction (DR0, CR0) that arrives in the SoC circuit.

In a cycle t6, the signature 22 is updated in the SoC circuit by the transactions (A1, DW1, CW1) and (DR0, CR0) and takes a value denoted SIG1-SoC. The bit S1 arrives in the SoC circuit and is compared with the bit in the same position in the signature SIG1-SoC.

This timing diagram shows that some signatures are computed using values mixing transactions, like the signatures SIG1-SoC and SIG1-DDR. Each transaction participates in a signature, in isolation or with another transaction, and the signatures on the two sides of the bus are computed using the same values.

In this case, the FIFO memory has a depth of two cycles, corresponding to the number of cycles that are necessary for a transaction to transit the bus in the example under consideration.

As has been indicated above, the signature generators 20 and 22 may be CRC code generators. In the present application, there may be a prompt to compute a CRC code on the address lines A (e.g., at least 6 lines for an elementary DDR memory module), 16 write-mode data lines (W), 16 read-mode data lines (R), four DMI lines (write-mode and read-mode) and the status bit of the ECC circuit, or a total of 43 bits. (Although the bus has only 16 data lines, the data move thereon at twice the clock frequency, so that 32 data bits are processed at the clock frequency.)

In principle, a CRC code generator operates on bits provided serially. Since the frequency of a DDR memory can exceed 1 GHz, the CRC code generator would need to work at close to 43 GHz, which is difficult to implement with current technologies. A CRC code generator can be designed to process a plurality of bits in parallel, but in view of the complexity and the difficulties at the level of the critical paths that this causes, this solution is limited to ten or so bits in practice. The operating frequency of the generator would still be too high for some applications.

Figure 4:
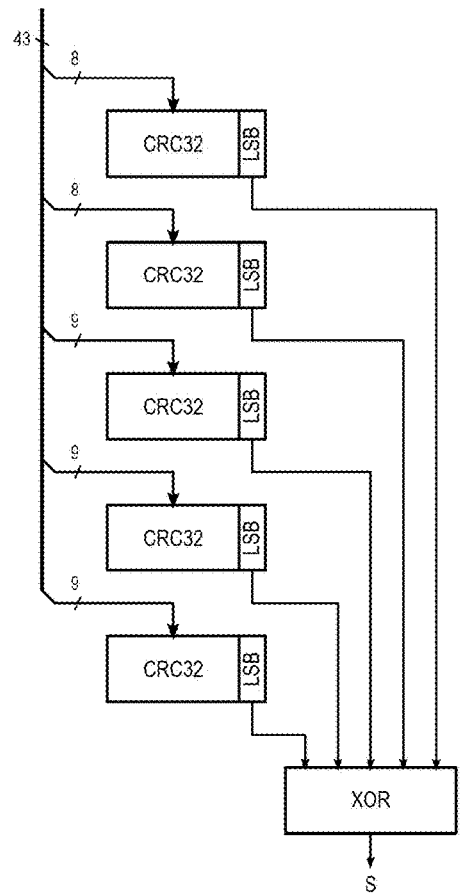
FIG. 4 schematically shows an embodiment of a CRC code generator that can be used in the system of FIG. 2.

FIG. 4 schematically shows an embodiment of a CRC code generator that can be used in the present application. The bits that it is hoped will be used to compute the signatures, 43 in the present example, are separated into a plurality of groups, in this case five groups of 8, 8, 9, 9 and 9 bits, respectively. Each group of bits is provided for an independent parallel CRC code generator that is adapted to the number of bits in the group (eight or nine). An exclusive OR gate XOR receives a bit of each CRC code in order to provide the bit for comparison S. The position of the bit of each CRC code can be arbitrary. In an embodiment, a position is chosen whose value is likely to change rapidly, and hence more readily in the least significant bits LSB.

The nature of the CRC codes may be chosen, for example, in order to provide a relatively long Hamming distance, for example a CRC code of 32 bits.

In an embodiment, the integrity checking may be optional. For example, an SoC which is configured to check the integrity of communications with a DDR may operating in a mode in which checking is not performed when the SoC is communicating with a DDR which is not configured to provide a checking bit, a DDR which is configured to provide a checking bit may operate in a mode in which checking is not performed when communicating with an SoC which is not configured to receive a checking bit, etc. In an embodiment, an SoC may determine an amount of bus delay, and set a delay for generating a signature based on the determined amount of bus delay. In an embodiment, more than one bit of a signature may be transmitted and compared (e.g., a subset of two bits of the total number of bits of a signature), for example, to facilitate detecting an error in fewer cycles.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   sending transactions from a master circuit to a slave circuit;
   verifying an integrity of communications between the master circuit and the slave circuit, the verifying including:
   updating a first cyclic multibit signature based on each transaction sent by the master circuit to the slave circuit;
   updating a second cyclic multibit signature based on each transaction received by the slave circuit; and
   comparing one or more bits based on the second cyclic multibit signature with corresponding bits based on the first cyclic multibit signature, wherein a number of the one or more bits based on the second cyclic multibit signature being compared is less than a total number of bits of the second cyclic multibit signature; and
   detecting and responding to an error condition based on the comparing, wherein the method includes:
   sending the transactions on a bus coupled between the master circuit and the slave circuit;
   storing each transaction in a first-in-first-out (FIFO) memory having a depth corresponding to a delay introduced by the bus;
   updating the first cyclic multibit signature based on an output of the FIFO memory; and
   transmitting from the slave circuit to the master circuit the one or more bits based on the second cyclic multibit signature on a line of the bus.

2. The method according to claim 1 wherein the slave circuit is a memory of a Double Data Rate (DDR) type and the one or more bits based on the second cyclic multibit signature are transmitted on one or more Data Mask Invert (DMI) lines of the bus.

3. The method according to claim 2 wherein the first and second cyclic multibit signatures are based on data read from the DDR memory.

4. The method according to claim 1 wherein the one or more bits is a single bit and the method comprises, for each transaction:
   dividing information used to update the second cyclic multibit signature into a plurality of groups;
   generating respective cyclic redundancy check (CRC) codes in parallel for each group; and
   performing an exclusive OR operation combining a single bit of each CRC code to produce the single bit.

5. The method according to claim 4 wherein the combined bits of the CRC codes are least significant bits.

6. The method of claim 1 wherein the one or more bits based on the second cyclic multibit signature is a single bit which is compared with a bit in a same position of the first cyclic multibit signature.

7. The method of claim 6, comprising:
   modifying a function of a bus line to transmit the single bit on a single bus line.

8. The method of claim 7 wherein the single bus line is a first Data Mask Invert (DMI) line of a bus interface.

9. The method of claim 8 wherein a function of a second DMI line is modified to correspond to two data bytes when the function of the first DMI line is modified to transmit the single bit.

10. A device, comprising:
    a bus interface; and
    error detection circuitry coupled to the bus interface, and which, in operation:
    updates a cyclic multibit signature based on a transaction transmitted on the bus interface;
    generates a first set of one or more error-detection bits based on the updated cyclic multibit signature, a number of bits of the first set of one or more error-detection bits based on the updated cyclic multibit signature being less than a total number of bits of the updated cyclic multibit signature;
    compares the first set of one or more error-detection bits to a second set of one or more error-detection bits received over the bus interface; and
    detects and responds to an error condition based on the comparing, wherein the error detection circuitry, in operation:

stores transaction information in a first-in-first-out (FIFO) memory having a depth corresponding to a delay introduced by a bus coupled to the bus interface; and
updates the cyclic multibit signature based on an output of the FIFO memory.

11. The device of claim 10 wherein the first set of one or more error-detection bits are a single bit.

12. The device of claim 10 wherein the second set of one or more error-detection bits are received on one or more Data Mask Invert (DMI) lines of the bus interface.

13. The device of claim 10 wherein the updated cyclic multibit signature is based on data read from a DDR memory coupled to the bus interface.

14. The device of claim 10 wherein the first set of one or more error-detection bits comprises a single error-detection bit, the error detection circuitry comprises a plurality of cyclic redundancy check (CRC) circuits, and the error detection circuitry, in operation:
divides information used to update the cyclic multibit signature into a plurality of groups;
generates respective cyclic redundancy check (CRC) codes in parallel for each group; and
performs an exclusive OR operation combining a single bit of each CRC code to produce the single error-detection bit.

15. The device of claim 14 wherein the combined bits of the CRC codes are least significant bits.

16. The device of claim 10 wherein the first set of one or more error-detection bits is a single bit of the updated cyclic multibit signature and the second set of one or more error-detection bits is a single bit of a second multibit signature in a same position as the single bit of the updated cyclic multibit signature.

17. A device, comprising:
a bus interface; and
a cyclic multibit signature computation circuit coupled to the bus interface, and which, in operation:
updates a cyclic multibit signature based on a transaction received on the bus interface; and
generates one or more error-detection bits based on the updated cyclic multibit signature, a number of the one or more error-detection bits based on the updated cyclic multibit signature being less than a total number of bits of the updated cyclic multibit signature, wherein, in operation,
the bus transmits the generated one or more error-detection bits;
a function of a first Data Mask Invert (DMI) line of the bus interface is modified to transmit the one or more error detection bits; and
a function of a second DMI line of the bus interface is modified to correspond to two data bytes.

18. The device of claim 17, wherein the device is a DDR memory and the one or more error-detection bits are a single bit transmitted on a single line of the bus interface.

19. The device of claim 18 wherein the cyclic multibit signature is based on data read from the DDR memory.

20. The device of claim 17 wherein the one or more error-detection bits comprise a single error-detection bit, the cyclic multibit signature computation circuit comprises a plurality of cyclic redundancy check (CRC) circuits, and the cyclic multibit signature computation circuit, in operation:
divides information used to update the cyclic multibit signature into a plurality of groups;
generates respective cyclic redundancy check (CRC) codes in parallel for each group; and
performs an exclusive OR operation combining a single bit of each CRC code to produce the single error-detection bit.

21. The device of claim 20 wherein the combined bits of the CRC codes are least significant bits.

22. A device, comprising:
a bus interface; and
error detection circuitry coupled to the bus interface, and which, in operation:
updates a cyclic multibit signature based on a transaction transmitted on the bus interface;
generates a first set of one or more error-detection bits based on the updated cyclic multibit signature, a number of bits of the first set of one or more error-detection bits based on the updated cyclic multibit signature being less than a total number of bits of the updated cyclic multibit signature;
compares the first set of one or more error-detection bits to a second set of one or more error-detection bits received over the bus interface; and
detects and responds to an error condition based on the comparing, wherein the error detection circuitry, in operation:
modifies a function of a first Data Mask Invert (DMI) line of the bus interface to receive the second set of one or more error detection bits; and
modifies a function of a second DMI line of the bus interface to correspond to two data bytes.

23. The device of claimer 22 wherein the error detection circuitry, in operation:
stores transaction information in a first-in-first-out (FIFO) memory having a depth corresponding to a delay introduced by a bus coupled to the bus interface; and
updates the cyclic multibit signature based on an output of the FIFO memory.

24. The device of claim 17 wherein the one or more error-detection bits is a single bit in a determined position of the updated cyclic multibit signature.

25. A system, comprising:
a bus;
a slave device coupled to the bus, and
a master device coupled to the bus, wherein:
the slave device, in operation:
updates a first cyclic multibit signature based on a transaction as received by the slave device;
generates a first set of one or more error-detection bits based on the updated first cyclic multibit signature, a number of the first set of one or more error-detection bits based on the updated first cyclic multibit signature being less than a total number of bits of the updated first cyclic multibit signature; and
transmits the generated first set of one or more error-detection bits to the master device on the bus; and
the master device, in operation:
updates a second cyclic multibit signature based on the transaction as transmitted by the master device;
generates a second set of one or more error-detection bits based on the updated second cyclic multibit signature, a number of bits of the second set of one or more error-detection bits based on the updated second cyclic multibit signature being equal to a number of bits of the first set of one or more error-detection bits;
compares the first set of one or more error-detection bits to the second set of one or more error-detection bits; and detects and responds to an error condition based on the comparing, wherein the master device comprises a first-in-first-out (FIFO) memory having a depth corresponding to a delay introduced by the bus, and, in operation:
stores transaction information in the first-in-first-out (FIFO) memory; and
updates the second cyclic multibit signature based on an output of the FIFO memory.

26. The system of claim 25 wherein the first set of one or more error-detection bits is a single bit.

27. The system of claim 26 wherein the bus comprises Data Mask Invert (DMI) lines, and, in operation,
a function of a first DMI line is modified to carry the first set of one or more error detection bits; and
a function of a second DMI line is modified to correspond to two data bytes.

28. The system of claim 25 wherein the first set of one or more error-detection bits comprises a single error-detection bit, the slave device comprises a plurality of cyclic redundancy check (CRC) circuits, and, in operation, the slave device:
divides information used to update the cyclic multibit signature into a plurality of groups;
generates respective cyclic redundancy check (CRC) codes in parallel for each group; and
performs an exclusive OR operation combining a single bit of each CRC code to produce the single error-detection bit.

* * * * *